(12) United States Patent
Rasmussen

(10) Patent No.: US 6,455,164 B1
(45) Date of Patent: Sep. 24, 2002

(54) METHOD FOR THE PREPARATION OF A LAMINATE AND A LAMINATE OBTAINABLE THEREBY

(76) Inventor: Max Otto Henri Rasmussen, 9 Skovbrynet, Karlslunde (DK)

(*) Notice: Subject to any disclaimer, the term of this patent is extended or adjusted under 35 U.S.C. 154(b) by 0 days.

(21) Appl. No.: 09/147,488

(22) PCT Filed: Jul. 15, 1997

(86) PCT No.: PCT/DK97/00311
§ 371 (c)(1),
(2), (4) Date: Jan. 8, 1999

(87) PCT Pub. No.: WO98/02303
PCT Pub. Date: Jan. 22, 1998

(30) Foreign Application Priority Data

Jul. 15, 1996 (DK) .............................................. 0786/96

(51) Int. Cl.⁷ ............................................... B32B 31/06
(52) U.S. Cl. .................... 428/420; 106/31.13; 156/310; 156/315; 426/75
(58) Field of Search ................................ 156/310, 315; 428/420; 106/31.13; 426/75

(56) References Cited

U.S. PATENT DOCUMENTS

| 2,427,519 | A | * | 9/1947 | Blyler ........................ 156/310 |
| 3,837,963 | A | * | 9/1974 | Frauenglass et al. ......... 156/310 |
| 4,175,972 | A | * | 11/1979 | Crivello .................... 106/31.13 |
| 4,198,739 | A | * | 4/1980 | Budinger et al. ............ 156/310 |
| 4,242,488 | A | * | 12/1980 | Stanley et al. ............ 156/331.7 |
| 4,818,325 | A | * | 4/1989 | Hiraiwa et al. .............. 156/315 |
| 5,527,616 | A | | 6/1996 | Hatano et al. |
| 5,973,045 | A | * | 10/1999 | Dowling et al. ............. 156/315 |

FOREIGN PATENT DOCUMENTS

| DE | 2 549 227 | 5/1976 |
| DE | 4 021 113 | 1/1992 |
| EP | 0 097 206 | 1/1984 |
| EP | 0 176 726 | 11/1988 |
| EP | 0 152 102 | 8/1989 |
| EP | 0 150 444 | 2/1990 |
| EP | 0 586 843 | 3/1994 |
| JP | A-179207 | 7/1993 |
| WO | WO97/03821 | 2/1997 |

OTHER PUBLICATIONS

CCD Excerpt, pp. 159–160 and 275, ©1977.*

* cited by examiner

Primary Examiner—John J. Gallagher
(74) Attorney, Agent, or Firm—Jacobson Holman, PLLC

(57) ABSTRACT

A laminate of two films is prepared by partially or completely covering a surface of a first film with a layer of ink comprising a catalyst suitable for accelerating curing of an adhesive for films and, subsequently, applying such an adhesive between the layer of ink and a second film before curing the adhesive.

18 Claims, No Drawings

METHOD FOR THE PREPARATION OF A LAMINATE AND A LAMINATE OBTAINABLE THEREBY

The present invention relates to a method for the preparation of a quick-curing laminate and a laminate obtainable thereby.

Plastic film is a frequently used material for the packaging of numerous articles and products. Within many fields of application, the requirements for such plastic films are of a character that cannot be met by one film alone. Consequently, various laminates of films have been developed with properties that in many respects meet the requirements better.

Usually, adhesives are used to attach separate films to each other, thus generating a laminate. Various requirements are made for such adhesives, e.g. adherence, heat resistance, transparency, and it has been proved that, inter alia, polyurethane-containing adhesives may be used for the adhesion of the separate films of a laminate, thus obtaining the requested properties of the laminate.

As far as polyurethane adhesives are concerned, it is problematic, however, that the curing time is long and that a laminate has to age, possibly at a comparatively high temperature and in a properly ventilated room, to ensure the adhesive curing.

In order to reduce the curing time of the adhesives employed, various methods have been used, including the addition of a catalyst for the curing reaction.

When using a catalyst, the simplest way to accelerate the curing of a polyurethane adhesive is to add the catalyst directly into the polyurethane adhesive, immediately before the adhesive is applied to a film that is to be attached to another film. On an industrial scale, this is not efficient, however, since to some extent the adhesive composition will have cured before use. The curing will cause an increased viscosity and a subsequently more difficult application to the film, whereby the application quantity cannot be controlled. A limited space of time is available for the administration so the adhesive composition, the so-called pot-life, and, in consequence, production disturbances may cause glue vessels and application devices having to be cleared of cured adhesives.

To overcome said problem of the low pot-life, in EP-A1-0152102 it is suggested to use a urethane adhesive containing micro capsules with a catalyst for the curing. Such micro capsules will be destroyed when the laminate film is attached by means of pressure rollers, whereby the encapsulated catalyst will be released.

The disadvantage of this method is that a homogenous distribution of the catalyst in the glue layer cannot be obtained, since the catalyst concentration will peak in the immediate vicinity of the destroyed capsule. Furthermore, such capsules will remain in the adhesive as a suspension and therefore precipitate when stored.

Another suggestion to bring a polyurethane adhesive into contact with the catalyst is disclosed in EP-A1-0586843. In this, a method for the preparation of a laminate film is disclosed, wherein at least two films are attached to each other by means of a polyurethane adhesive, the adhesive layer or the adhesive-free film being humidified with an aqueous solution bearing at least one catalyst, which accelerates the curing reaction of polyurethane adhesives. The catalyst solution humidification is problematic, however, since it will be difficult to obtain a homogenous distribution of the solution on a film, e.g. a polyethylene or polypropylene film, even when using a surfactant in the solution, inter alia, because suitable equipment for a homogenous application of the catalyst solution all over the film is not available, so that in certain sections of the prepared laminate water will accumulate, which leads to an isocyanate conversion to the corresponding amine compound, thus involving the risk of subsequent amine compound migration. Therefore, whenever preparing a laminate according to the method disclosed in EP-A1-0586843, it is necessary to age the said laminate before use, in particular when foreseen for the packaging of food.

In international patent application No. PCT/DK 96/00319, publication No. WO-A-97/03821 (which was not available to the public on the priority date of the present application), the present applicant suggested to bring the catalyst into contact with the adhesive by incorporating the catalyst in one of the films to be attached to each other by means of the adhesive. Although this reduces the curing time considerably and results in a low migration of amine compounds so far as laminates with no ink between the films are concerned, the suggestion is not recommendable when the catalyst-containing film has to be printed with ink, because the layer of ink will prevent a diffusion of catalyst from the film to the adhesive.

The object of the present invention is to provide a method for the preparation of a laminate having ink on one or both films to be attached to each other, whereby the laminate is ready for further treatment comparatively soon after its preparation, without any long-lasting ageing period.

According to the invention, this is achieved by
a) providing an ink comprising a catalyst suitable for accelerating the curing of an adhesive for films,
b) applying to a first film one or more completely or partially covering layers of the said ink,
c) laminating a second film to the first film inked surface, using an adhesive, the curing of which is accelerated by the catalyst.

The present invention relates to the laminate obtainable by this method as well. Furthermore, the invention relates to the film being coated with one or more entirely or partially covering layers of ink obtainable after step b) of the method.

Soon after the preparation of the laminate according to he invention, the measurable amine migration is comparatively low, and, in addition, a fairly satisfactory mutual adherence of the films is obtained shortly after the preparation of the laminate. Due to the quick-curing of the adhesive used as well as the low amine migration, the laminate prepared needs no or only moderate ageing before further treatment. Especially within the food industry a low amine migration is in great demand, and, when in use, the laminate should show no amine migration at all. The fact that the laminate prepared may be exposed to further treatment shortly after its preparation is advantageous from a producer's point of view, inter alia, because this will reduce the need for storage room, and, sales of the laminate prepared can start sooner after production.

Moreover, a laminate according to the invention has a reduced tendency to telescoping, i.e. shear of the films relative to each other.

The term "ink" used in the present description and claims refers to both pigmented and un-pigmented inks and varnishes as well as clear and coloured varnishes. For the application of the inks methods known from the prior art, e.g. gravure, flexography or offset printing, may be used.

The ink employed may be of any suitable type, e.g. nitrocellulose, PVB, acrylic, acrylate or combinations thereof. In addition, the inks may be offset inks, e.g. oil-based or water-based. The ink may have any colour or be uncoloured.

The inks may be based on any solvent, in particular, they may be dilutable in ethanol, isopropanol, ethylacetate, methylethylketone, acetone, water or combinations thereof. Furthermore, solvent-free inks may be used.

The inks used according to the invention may be single-component, dual-component and/or even three-component inks. Single-component inks are immediately employable for printing, possibly after having been diluted by a suitable solvent. Dual-component inks are foreseen to be mixed immediately before use, whereby the first component comprises a standard ink and the second component the catalyst suitable for accelerating the curing of an adhesive for films.

Any adhesive curing in the presence of a catalyst may be used. Preferred adhesives are of the polyurethane type and alcohol-based or water-based imine-epoxy systems. Polyurethane adhesives may be single-component systems or dual-component systems. A polyurethane adhesive comprises at least one organic polyisocyanate and at least one polyol, the polyisocyanate comprising two or more isocyanate groups, and the polyol two or more hydroxy groups. The polyol may be a polyester polyol, a polyether polyol or a polyetheresterpolyol. The polyisocyanate may be a pre-polymer.

Typical examples of diisocyanates for polyurethane adhesives are 1,6-hexanediisocyanate, 1,10-decanediisocyanate, 1,3-cylopentanediisocyanate, 1,4-cyclohexanediisocyanate, 1-isocyanat-3,3,5-trimethyl-3 or 5-isocyanatomethancyclohexane, 4,4'-, 2,4'- and 2,2'-diisocyanate diphenylmethane, 1,5-nanhtalenediisocyanate, 4,4'-diisocyanate-dicyclohexylmethane, 1,4-di-isocyanate-benzene and/or 2,4- or 2,6-diisocyanate-tolu-ene. Pre-polymers of polyisocyanates may be achieved by reacting the above diisocyanates with a polyvalent alcohol.

Typical examples of polyols for polyurethane adhesives are alkanediols with linear or branched carbon chains, e.g. ethylene glycol, 1,2-dihydroxypropane, 1,3-dihydroxypropane, 1,4-dihydroxybutane, 1,6-dihydroxyhexane and neopentylglycol. In case of the polyol being a polyetherpolyol, this is usually obtained by adding ethylene oxid to a compound comprising two or more active hydrogen atoms in a molar ratio of 30 to 90%. Suitable examples of compounds comprising two or more active hydrogen atoms are ethylene glycol, diethylene glycol, propylene glycol, dipropylene glycol, glycerin, trimethylolpropane, pentaerythritol, sorbitol, saccharose or the like. Instead of ethylenoxid e.g. propylenoxid and butylenoxid may be used. In general, polyetherpolyol has a molecular mass in the range from 1,000 to 20,000, especially between 1,000 and 5,000.

Polyurethane adhesives used for single-component systems comprise e.g. pre-polymers of polyisocyanates and polyols, the said adhesive curing when reacted with water. Examples of this may be found in German patent No. 2549227 and European patent application No. 0586843 A1.

Dual-component systems either consist of pre-polymers with free isocyanate groups curing by means of a hydroxy group bearing cross-linking agent, or of pre-polymers with free hydroxy groups, curing by means of isocyanate group bearing cross-linking agents. Examples of the first type of dual-component systems are disclosed in German laid-open publication No. 4021113 and in European patent No. 150444. Examples of the latter type of dual-component systems are listed in European patent No. 176726. No matter the type of polyurethane adhesive, these may comprise a solvent, be free of solvents or water-based. For the method according to the present invention, it is preferred to use a dual-component system, in which the various components are mixed immediately before their application to the first film.

The catalysts accelerating the curing of the polyurethane adhesives are known from the prior art. Various substance groups are proved active catalysts, inter alia Lewis bases and Lewis acids. The most important Lewis bases are tertiary amines, e.g. diazabicyclooctane, triethylamine, dimethylbenzylamine, bisdimethylaminoethylether, tetramethylguanidine and bisdimethylaminomethylphenol. The most important catalytically effective Lewis acids are metallo-organic compounds, especially ten organic compounds, like tindiethylhexanoate, dibutyltindilaurate, dibutyltinbisdodecylmercaptide and lead-phenylethyldithiocarbaminate. Presumably, the metallo-organic compounds are activating the isocyanate groups thus making these electrophile, whereas the bases first and foremost increase the nucleophile properties of the OH group.

Other known catalysts are alkaline salts of organic acids and phenols, like phenol-Mannich-bases, phosphine and phospholinoxide.

Also $\epsilon$-caprolactam has catalytic properties, and in the present invention the use of $\epsilon$-caprolactam, which is available as a powder, flakes or in a fluid form, is preferred as a catalyst.

The catalyst itself may be an appropriate mixture of several different catalysts so as to obtain an optimal curing in relation to various types of adhesive Usually, the catalyst content of ink is up to 20%, however, a catalyst content of approximately 5% of the solid content of the ink proved to be particularly suitable.

The catalyst, per se, may be added to the ink immediately or, as a pre-solution, optionally with use of a surfactant to obtain a homogenous distribution in the ink. The catalyst preferred, $\epsilon$-caprolactam, is preferentially added to the ink as a pre-solution. Appropriately, the pre-solution comprises equal parts of $\epsilon$-caprolactam and isopropanol and/or water.

The first film may partially or entirely be made of a plastic material, preferably chosen from polyesters, in particular orientated polyesters; polyolefines, e.g. polyethylenes and orientated polypropylenes or cast polypropylenes; polyamides, in particular cast polyamides or orientated polyamides; and cellophane.

The second film may be of the same type as the first film. Preferentially, however, the second film consists entirely or partially of aluminium-containing materials, metallized plastics, paper, metallized paper, or plastic materials, in particular polyethylene and polypropylene.

Both the first and the second film may incorporate a catalyst for an adhesive. Using a film with an incorporated catalyst is particularly recommendable in case of only partial application of ink to the film. In this way, a catalyzed curing also takes place outside the areas of the film covered with catalyst-containing ink.

In cases when a film without an incorporated catalyst is used along with partial application of a catalyst-containing coloured ink it is recommendable to apply a completely covering layer of clear varnish or unpigmented catalyst-containing ink to the first film. In this way, a catalyzed curing is ensured outside the areas of the film originally covered with the coloured ink as well.

Multi-colour printing is well-known in the prior art, i.e. applying several layers of different inks consecutively or on top of each other. All applied inks may contain a catalyst, so that catalyzed curing is taking place within all areas of the laminate. If at last a completely covering ink is applied, a so-called background colour, only that ink needs to contain a catalyst to ensure a catalyzed curing within all areas of the laminate.

The first and/or the second film may be a laminate, per se. In particular when using a metallo-film in the laminate, it may be advantageous to coat the metallo-film with a plastic f prior to applying the ink.

When the catalyst-containing ink has been applied to the first film this is laminated to the second film. The adhesive may either be applied to the first or the second film, prior to their being attached together or be added simultaneously. Preferably, the adhesive is applied to the first ink covered film.

The laminates prepared may be used for the wrapping and packaging of food, i.e. they get into immediate contact with food. Therefore, it must be ensured that no noxious substances are transferred to the food, or at least the extent of the transfer must be non-toxic. ε-caprolactam is a comparatively non-toxic compound, which is released for the market by the authorities for use in materials getting into contact with food. Since the catalyst is placed between the two films of the laminate, it will rot set into immediate contact with the food.

Without any intention of limiting the invention to any specific theoretical explanation, it is assumed, that the catalyst in the ink diffuses and penetrates the adhesive layer thus accelerating the curing of the adhesive.

In the following, the present invention will be illustrated by means of examples, however, these examples are not to be considered as a limitation of the scope of the protection.

EXAMPLE 1

Two inks, one with and one without a catalyst, were applied to separate areas of a first film. After a few days of storage, an adhesive was applied to the first film, and a second film was laminated thereto. After the lamination, the adherence and the amine migration was measured at certain intervals.

The first film was a corona-treated 30 $\mu$m polypropylene film (Mobil MB400), and the second film was a 50 micron polyethylene film (Borealis 0601 standard). The adhesive was a MorFree 403a/C79 mixed in the ratio 100:65 and applied in a density of 1.5 g/m².

The ink was a white "Resino Reversal 142" type from Resino A/S having a solid content of 60% (w/w) The catalyst-containing ink labelled "A1" was prepared by adding a solution of 300 g ε-caprolactam flakes dissolved in 300 ml of isopropanol into 10 kg of the above ink. During 14 days of storage, the viscosity of the catalyst-containing ink remained essentially unchanged. The ink without any catalyst was labelled B1. Both inks were applied in a layer of 1.5 $\mu$m.

The adherence was measured according to DIN 53357 (unit: N per 15 mm), whereas the amine migration was measured as the migration of primary aromatic amines (e.g. 2,4-toluenediamine and 4,4'-diamino-diphenyl-methane), by a process wherein the amine is coupled to N-(1-naphthyl)-ethylenediamine-dihydrochloride for the formation of a coloured addition product. The formation of the addition product was measured as the absorbance at a wave length of 550 nm. The concentration was measured in $\mu$g/dm².

The results are indicated in Table Ia and Ib below:

TABLE Ia

| ADHERENCE | 2 hours | 4 hours | 6 hours | 1 day | 3 days | 8 days |
|---|---|---|---|---|---|---|
| A1 ink | 0.02 | 0.15 | 1.10 | 4.00 | 4.50 | 4.60 |
| B1 ink | 0.01 | 0.04 | 0.09 | 1.80 | 4.00 | 4.00 |

TABLE Ib

| AMINE MIGRATION | 1 day | 3 days | 5 days | 9 days |
|---|---|---|---|---|
| A1 ink | 32 | 10 | 1.0 | 0.3 |
| B1 ink | 63 | 26 | 9.5 | 4.5 |

The tables show that the use of a catalyst-containing ink accelerates the curing of the laminates and makes the amine migration decrease sooner. Furthermore, considerably lower amine migration values are obtained when using a catalyst-containing ink compared to the results obtainable when using an-ink without a catalyst, at least within the observed time period.

EXAMPLE 2

The same procedure was adopted as in Example 1, only an unpigmented ink (trademark: Resino Reversal) having a solid content of 30% (w/w) was used. The catalyst-containing ink was labelled A2 and prepared by adding a solution of 62.5 g ε-caprolactam flakes dissolved in 62.5 g isopropanol to 10 kg of the ink. The ink without any catalyst was labelled B2. The adhesive is as stated in Example 1.

Measurement of the adherence and the amine migration followed as described in Example 1. The results are indicated in Table IIa and IIb below:

TABLE IIa

| ADHERENCE | 2 hours | 4 hours | 6 hours | 1 day | 3 days | 8 days |
|---|---|---|---|---|---|---|
| A1 ink | 0.05 | 1.00 | 2.10 | 3.40 | 4.10 | 4.50 |
| B1 ink | 0.01 | 0.06 | 0.11 | 2.20 | 3.30 | 3.90 |

TABLE IIb

| AMINE MIGRATION | 1 day | 3 days | 5 days | 9 days |
|---|---|---|---|---|
| A1 ink | 24 | 6 | 0.9 | 0.3 |
| B1 ink | 60 | 26 | 10.5 | 3.6 |

The tables show that the use of a catalyst-containing ink accelerates the curing of the laminates and makes the amine migration decrease sooner. Furthermore, considerably lower amine migration values are obtained when using a catalyst-containing ink compared with the results obtained when using an ink without a catalyst, at least within the observed time period.

EXAMPLE 3

In this example, the adherence effect from various concentrations of ε-caprolactam in the ink was studied at room temperature and at an elevated temperature, at various time intervals after the lamination.

The first film was an oriented 30 $\mu$m polypropylene film from UCB, whereas the second was a 50 $\mu$m polyethylene film (trademark Sengewald K-203). The adhesive was a Novacote SF782 A and CA 375 mixed in te ratio 100:36. The adhesive was applied in a layer of 1.7–1.9 g/m² to the first ink-treated film.

The ink was white (Resino Reversal 142) and supplemented with various concentrations of ε-caprolactam.

Two samples from each run were stored at room temperature and for 6 hours at 35° C., followed by room temperature, respectively, whereupon the adherence was measured according to DIN 53357. The results are listed in Tables IIIa and IIIb.

TABLE IIIa

| Concentration of ε-caprolactam % (w/w) | Storing at Room Temperature Adherence | | | | |
|---|---|---|---|---|---|
| | after 1 hour | after 2 hours | after 4 hours | after 6 hours | after 24 hours |
| 0.0 | <0.3 | 0.5 | 1.6 | 2.3 | 4.7 T |
| 1.25 | 0.6 | 1.3 | 2.5 | 4.7 T | 3.5 T |
| 2.5 | 1.7 | 2.7 | 3.1 T | 3.5 T | 4.7 T |
| 5.0 | 3.5 P + T | 4.7 T | 4.8 T | 4.8 T | 3.5 T |

T = Tear
P = Peel

TABLE IIIb

| Concentration of ε-caprolactam % (w/w) | Storing for 6 hours at 35° C., Followed by Storing at Room Temperature Adherence | | | | |
|---|---|---|---|---|---|
| | after 1 hour | after 2 hours | after 4 hours | after 6 hours | after 24 hours |
| 0.0 | 0.6 | 2.0 | 4.3 T | 5.0 T | 4.5 T |
| 1.25 | 2.0 | 4.6 T | 4.2 T | 3.2 T | 4.6 T |
| 2.5 | 3.8 T | 4.7 T | 4.9 T | 4.9 T | 4.7 T |
| 5.0 | 3.7 T | 4.1 T | 4.8 T | 4.4 T | 4.8 T |

T = Tear

From the tables IIIa and IIIb it may be deduced that an increased concentration of ε-caprolactam accelerates the curing of the laminates produced. Furthermore, also storing at increased temperatures results in curing acceleration. One hour after production, the adherence of the laminates containing 2.5 and 5.0% (w/w) ε-caprolactam, respectively, is adequate for further treatment of the laminates. By way of comparison, laminates with no ε-caprolactam must be stored at least 4 hours before use.

EXAMPLE 4

A first polyester-type film and a second film, which is a laminate between an aluminium film and a polyethylene film, was provided.

The first film was coated with a transparent ink ("Resino Reversal" without pigment) in a 1.5 μm layer, whereupon an adhesive ("Novacote SF 782A" and "CA 375", mixed in the ratio of 100:40) was applied in an amount of 1.7–1.9 g/m². With the aluminium side against the adhesive, the second film was laminated thereto.

Using increasing amounts of ε-caprolactam, the adherence was measured after storing at room temperature (Table IVa) as well as after storing 6 hours at 35° C. followed by room temperature (Table IVb). The results are shown in the tables below.

TABLE IVa

| Concentration of ε-caprolactam % w/w | Storing at Room Temperature Adherence (N/15 mm) | | | | |
|---|---|---|---|---|---|
| | after 1 hour | after 2 hours | after 4 hours | after 6 hours | after 24 hours |
| 0.0 | 0.2 | 0.5 | 2.0 | 1.9 | 3.4 P + T |
| 1.25 | 0.5 | 1.0 | 2.3 | 2.9 | 4.9 P + T |
| 2.5 | 0.6 | 2.1 | 2.8 | 3.7 P + T | 3.1 P + T |
| 5.0 | 2.0 | 3.3 | 4.0 P + T | 3.0 P + T | 3.6 T |

T = Tear
P = Peel

TABLE IVb

| Concentration of ε-caprolactam % (w/w) | Storing for 6 hours at 35° C., Followed by Storing at Room Temperature Adherence (N/15 mm) | | | | |
|---|---|---|---|---|---|
| | after 1 hour | after 2 hours | after 4 hours | after 6 hours | after 24 hours |
| 0.0 | 0.5 | 2.1 | 2.8 | 3.2 P + T | 3.2 P + T |
| 1.25 | 0.7 | 2.5 | 5.3 P + T | 3.4 T | 4.9 T |
| 2.5 | 1.8 | 2.7 | 3.3 P + T | 3.0 P + T | 3.0 P + T |
| 5.0 | 2.8 | 4.0 P + T | 3.4 P + T | 3.5 P + T | 3.6 T |

P = Peel
T = Tear

From the tables IVa and IVb it may be deduced that an increased concentration of ε-caprolactam accelerates the curing of the laminates produced. Furthermore, also storing at increased temperatures results in curing acceleration.

The laminate produced has a metallic appearance. It may be used for packaging aromatic products, e.g. coffee.

What is claimed is:

1. A method for preparing a laminated food-wrapping film which minimizes or eliminates amine migration, which method comprises:
    a) providing an ink comprising a catalyst suitable for accelerating curing of a polyurethane-type adhesive for films, wherein the ink is a member selected from the group consisting of nitrocellulose, PVB, acrylic, acrylate or combinations thereof,
    b) applying to a first film one or more completely or partially covering layers of the ink, and
    c) laminating a second film to the first film's inked surface using a polyurethane-type adhesive, the curing of which is accelerated by the catalyst, to form the laminated food-wrapping film.

2. A method according to claim 1, wherein the catalyst is a member selected from the group consisting of ε-caprolactam and dibutyltindilaurate, and the catalyst is present in an amount not exceeding 20% by weight based upon the solid content of the ink.

3. A method according to claim 1, wherein the catalyst is present in an amount of approximately 5% by weight, based upon the solid content of the ink.

4. A method according to claim 1, wherein the adhesive is applied to the first film coated with ink, the first film being subsequently laminated to the second film.

5. A method according to claim 1 wherein the first film is partly covered with one or more layers of the ink.

6. A method according to claim 1, wherein the first film is entirely or partially made of a plastic material.

7. A method according to claim 6, wherein the plastic material is a member selected from the group consisting of a polyester, a polyolefine, a polyamide and cellophane.

8. A method according to claim 6, wherein the polyester is an oriented polyester, the polyolefine is a polyethylene, oriented polypropylene or cast polypropylene and the polyamide is cast polyamide or an oriented polyamide.

9. A method according to claim 1, wherein the second film is entirely or partially made of aluminum containing material, metallized plastic, paper, metallized paper, or a plastic material.

10. A method according to claim 9, wherein the plastic material is polyethylene or polypropylene.

11. A method according to claim 1, wherein the first and/or the second film is a laminate per se.

12. A laminate obtainable by means of the method according to claim 1.

13. A quick-cured laminated composite film which is useful as a food-wrapping film and which comprises a first film and a second film, inside surfaces of which are secured together by a polyurethane-type adhesive cured in situ and in contact with ink completely or partially covering the inside surface of the first film and comprising a catalyst for accelerating cure of the adhesive, wherein the ink is a member selected from the group consisting of nitrocellulose, PVB, acrylic and acrylate, and said composite film is one which minimizes or eliminates amine migration therethrough.

14. A quick-cured laminated composite according to claim 13 wherein the first film is entirely or partially made of a plastic material.

15. A quick-cured laminated composite film according to claim 14, wherein the plastic material is a member selected from the group consisting of a polyester, a polyolefine, a polyamide and cellophane.

16. A quick-cured laminated composite film according to claim 14 wherein the polyester is an oriented polyester, the polyolefine is a polyethylene, oriented polypropylene or cast polypropylene and the polyamide is cast polyamide or an oriented polyamide.

17. A quick-cured laminated composite film according to claim 13 wherein the second film is entirely or partially made of aluminum containing material, metallized plastic, paper, metallized paper, or a plastic material.

18. A quick-cured laminated composite film according to claim 17, wherein the plastic material is polyethylene or polypropylene.

* * * * *